Jan. 7, 1930.   H. A. SELAH   1,742,419
CONDUIT FITTING
Filed Feb. 19, 1927
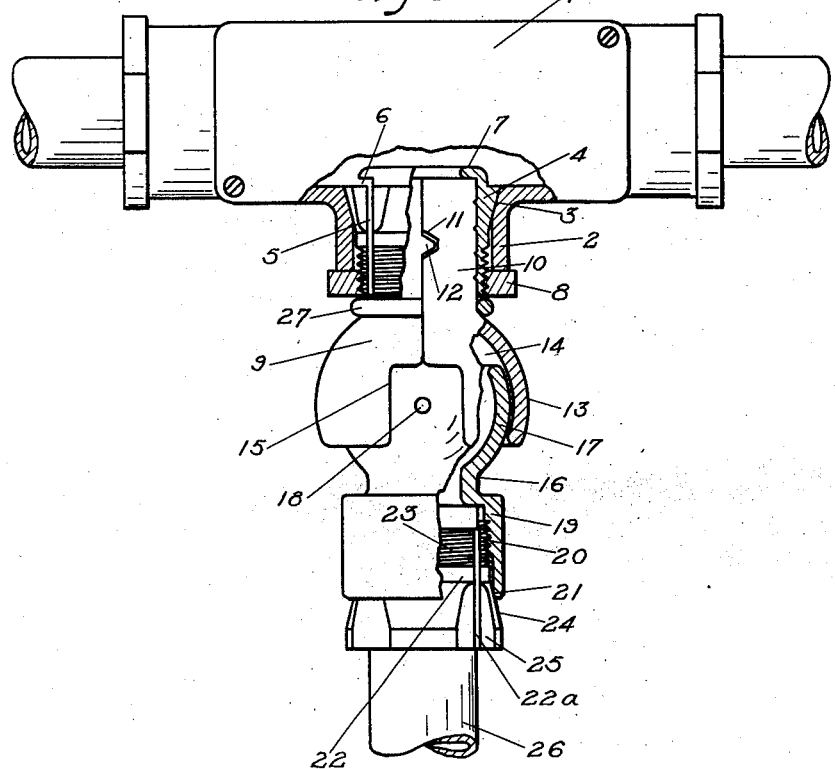
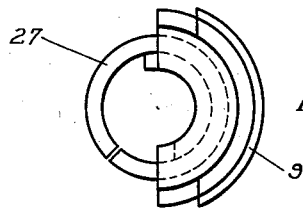
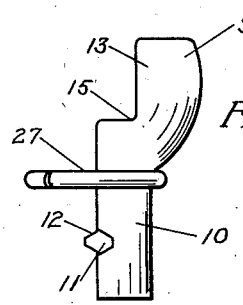
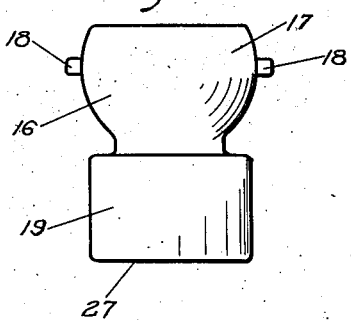
Howard A. Selah
INVENTOR.
BY
ATTORNEYS.

Patented Jan. 7, 1930

1,742,419

UNITED STATES PATENT OFFICE

HOWARD A. SELAH, OF ERIE, PENNSYLVANIA, ASSIGNOR TO ERIE MALLEABLE IRON COMPANY, OF ERIE, PENNSYLVANIA, A CORPORATION OF PENNSYLVANIA

CONDUIT FITTING

Application filed February 19, 1927. Serial No. 169,648.

The purpose of the present invention is to provide a flexible fitting usually used where a section of conduit is suspended and in carrying out the invention a ball and socket joint is used. Features and details of the invention will appear from the specification and claims. A preferred embodiment of the invention is illustrated in the accompanying drawings as follows:—

Fig. 1 shows a side elevation of the structure, partly in section.

Fig. 2 an end view of one of the parts of the socket member of the conduit joint.

Fig. 3 a side elevation of the same.

Fig. 4 a side elevation of the ball member of the joint.

1 marks a conduit fitting, as shown, a conduit box. This has an extension 2 with a tapered surface 3. A sleeve 4 is arranged in the extension 2 and has wedge surfaces engaging the surface 3. The sleeve has a longitudinal slot 5 terminating in a circumferential slot 6 and is thus made contractible. The sleeve has a guard shoulder 7 along its inner end and is provided with a nut 8 on its outer end by means of which the wedging surfaces are drawn together and the sleeve contracted.

The socket member 9 of the joint is provided with a shank 10 of sleeve-like shape and is formed in two parts. These parts are interchangeable, each having a notch 11 in one edge and each a projection 12 in the opposite edge so that when the opposing parts are put together the projections 12 enter the notches 11, locking the socket members in axial relation. The members have the socket-forming lips 13 forming a ball-receiving chamber, 14. They are also cut away at 15 forming an open notch for purposes hereinafter described.

The ball member 16 is hollow and provided with a ball 17 which is movably secured in the socket 13. Pins 18 extend from the ball in the notch 15. The purpose of these pins is to prevent a rotative movement of the ball in the socket so as to prevent putting an excessive twisting strain on an inserted conductor.

The ball member has a conduit-securing extension 19. This is screw-threaded at its inner end at 20 and has an annular engaging surface 21 at its outer end. A sleeve 22 is arranged in the end 19. It has a slot 22ª extending through it making the sleeve contractible and is provided with screw threads 23 at its inner end engaging the screw threads 20, a wedging intermediate portion 24, and a wrench-hold 25 at its outer end. This is adapted to engage a conduit 26 as it is screwed into the end 19 through the wedging action of the end 21 on the non-threaded portion 24, thus locking a conduit in place.

I prefer to provide a split ring 27 which is simply a resilient piece of wire and holds the parts of socket member in place so that it can be readily manipulated to position prior to the clamping by the contractible sleeve.

What I claim as new is:—

1. In a conduit fitting, the combination of a hollow ball member; a separable socket member on the ball member; and a fitting device to which the socket member is secured comprising a clamp clamping the parts of the socket member together, said clamp securing the socket member to the fitting device.

2. In a conduit fitting, the combination of a hollow ball member; a separable socket member on the ball member, the parts of the separable socket member being similar in shape and interchangeable; and a fitting device to which the socket member is secured comprising a clamp clamping the parts of the socket member together, said clamp securing the socket member to the fitting device.

3. In a conduit fitting, the combination of a hollow ball member; a separable socket member on the ball member; and a fitting device to which the socket member is secured comprising a slotted sleeve into which the socket member extends and means contracting the sleeve on the socket member, said clamp securing the socket member to the fitting device.

4. In a conduit fitting, the combination of a socket member made in two interchangeable parts, said parts having interlocking projections and grooves; a ball member arranged in the socket member; means for securing the socket member in a conduit fitting; and a conduit-securing means on the ball member.

5. In a conduit fitting, the combination of a hollow ball member; a separable socket member on the ball member; fitting devices secured to said members; and means locking the members against rotative movement relatively to each other on the axis of said members, comprising a pin on the ball member and a receiving slot in the socket member.

6. In a conduit fitting, the combination of a hollow ball member; a separable socket member on the ball member; fitting devices secured to said members; and a yielding means holding the parts of the socket member initially together.

7. In a conduit fitting, the combination of a hollow ball member; a separable socket member on the ball member; a fitting device to which the socket member is secured comprising a clamp clamping the parts of the socket member together; and a yielding means holding the parts of the socket member initially together.

In testimony whereof I have hereunto set my hand.

HOWARD A. SELAH.